No. 630,218. Patented Aug. 1, 1899.
J. E. HARTWELL.
MECHANICAL MOVEMENT.
(Application filed May 4, 1899.)
(No Model.)
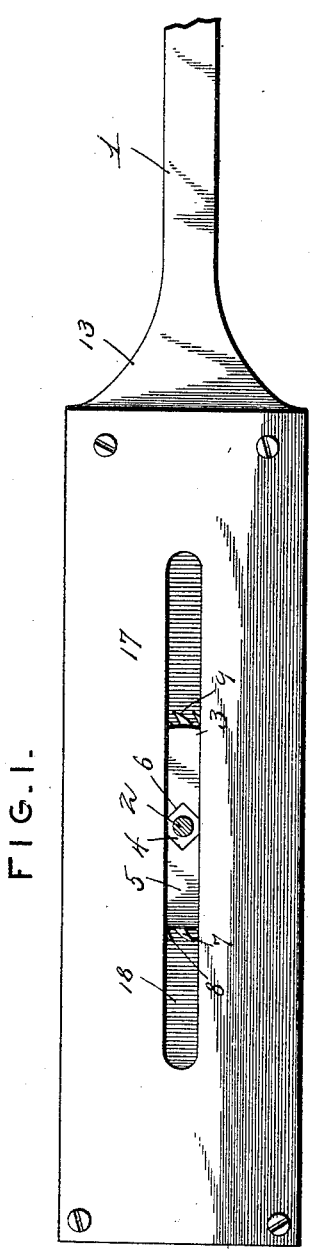
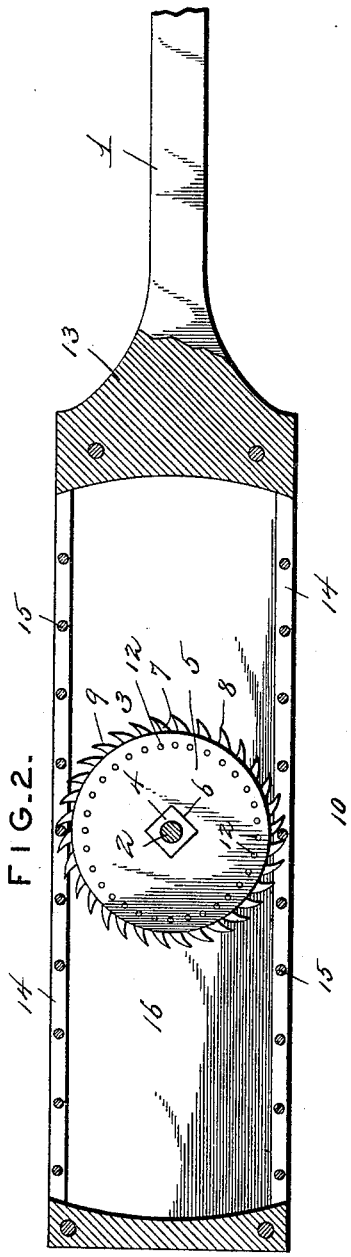
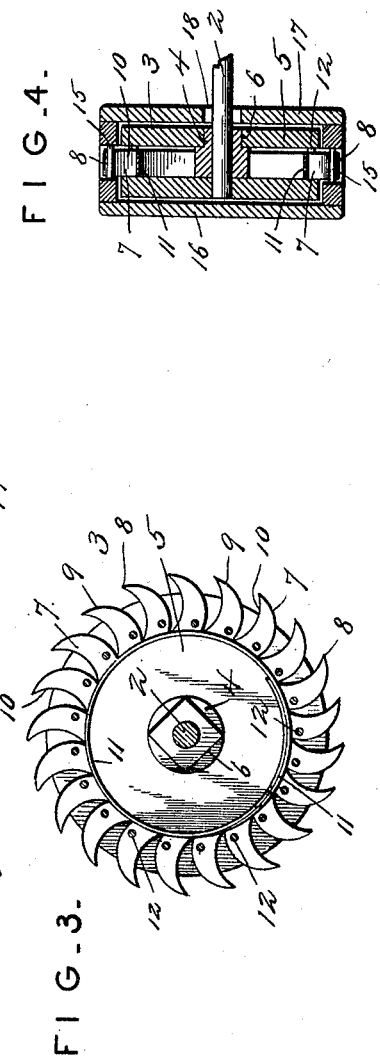
Witnesses
Harry L. Amer
Rexford M. Smith
Inventor
Jacob E. Hartwell.
By U. D. Stockbridge,
Attorney.

UNITED STATES PATENT OFFICE.

JACOB E. HARTWELL, OF TROY, MONTANA, ASSIGNOR OF ONE-HALF TO GEORGE W. WATERS, OF SAME PLACE.

MECHANICAL MOVEMENT.

SPECIFICATION forming part of Letters Patent No. 630,218, dated August 1, 1899.

Application filed May 4, 1899. Serial No. 715,580. (No model.)

*To all whom it may concern:*

Be it known that I, JACOB E. HARTWELL, a citizen of the United States, residing at Troy, in the county of Flathead and State of Montana, have invented a certain new and useful Mechanical Movement, of which the following is a specification, reference being had therein to the accompanying drawings.

This invention relates to mechanical movements, the object in view being to provide novel means whereby reciprocating motion may be converted into rotary motion.

The invention contemplates a reciprocating bar provided with a double rack, the said bar being adapted to move at all times in a rectilinear path and in the same direct line without lateral movement, the pinion with which the rack coöperates being provided with yielding teeth which are capable of being engaged positively at one side of the pinion by the rack and which are capable of automatically disengaging themselves from the rack at the opposite side.

The detailed objects and advantages of the invention will appear in the course of the ensuing description.

The invention consists in a mechanical movement embodying certain novel features and details of construction hereinafter fully described, illustrated in the drawings, and incorporated in the claims.

In the accompanying drawings, Figure 1 is a side elevation of the elements which make up the improved mechanical movement. Fig. 2 is a longitudinal section through the mechanism. Fig. 3 is an enlarged detail section through the gear-wheel or pinion, showing the manner of pivoting the teeth and showing the means for maintaining the teeth in their normal or operative positions. Fig. 4 is a cross-section through the mechanism, taken in line with the shaft of the gear-wheel.

Similar numerals of reference designate corresponding parts in all the views.

Referring to the drawings, 1 designates a reciprocating bar or rod, and 2 a rotary shaft to which rotary motion is to be communicated from the rod 1 by means of mechanism interposed between the rod and shaft, as hereinafter described.

In carrying out the present invention a gear-wheel or pinion 3 is mounted fast upon the shaft 2. The wheel comprises a hub 4 and a pair of side plates 5, one of which is fast on the hub and the other detachable and provided with a centrally-located square or polygonal opening 6 to fit the hub 4, one end of which is squared or polygonal to receive said plate, whereby both plates are caused to rotate with the shaft. Pivotally mounted between the plates 5 are teeth 7, the outer ends or points of which (indicated at 8) project beyond the peripheries of the plates 5, as shown. The points of the teeth are inclined or beveled on their rear edges, as indicated at 9, and the operative edges of the teeth, as shown at 10, are slightly concaved and extend substantially in radial lines outward from the axis of rotation or center of the shaft 2. The teeth 7 are of segmental shape, each tooth being provided with one convex and one concave side. The inner portions or bases of the teeth 7 are slightly concaved and are described on the arc of a circle of which the shaft 2 is the center. Extending around within the teeth 7 is a circular spring 11, which bears at all times against the bases of all the teeth and serves to return said teeth to their normal or operative positions after they have been deflected by the rack, hereinafter described. The teeth are all pivotally mounted intermediate their ends, as shown at 12, so that the points of the teeth may be pressed inward to lie wholly within the plane of the outer peripheries of the plates 5, and when they are thus pressed inward the bases of the teeth operate against the spring 11, forcing said spring inward. When pressure on the teeth is relieved, the spring operates to automatically rock the teeth upon their pivots until the teeth assume their normal positions and the points thereof project outward beyond the peripheries of the plates 5, in a manner that will be readily understood.

The rod or bar 1 is enlarged, as shown at 13, and provided with two parallel racks 14, the teeth 15 of which are adapted to engage the teeth of the gear-wheel on opposite sides. The racks 14 are connected on one side of the gear-wheel by means of a plate 16, which may be imperforate and which may serve to close that side of the frame comprising the reciprocating rack. Upon the opposite side of the frame is a similar plate 17, which, however, is provided with a longitudinal slot 18 to embrace and slide upon the shaft 2 of the gear-wheel, the slot 18 being of sufficient length to allow of the necessary movement of the rack-bar.

As the rack-bar is moved in one direction one of the racks 14 engages positively with the teeth of the gear-wheel, and by said engagement the gear-wheel and its shaft are rotated in one direction, the teeth at the opposite side of the gear-wheel yielding and being pressed inward, so as to slip by the teeth of the rack 14 at that side of the gear-wheel. When the reciprocating rod or bar is moved in the opposite direction, the opposite rack engages positively with the teeth of the gear-wheel and the rack on the other side of the gear-wheel slips over the teeth of the gear-wheel as the latter yield inward and pass within the peripheries of the plates 5. It will thus be seen that the rack-bar may be reciprocated in a rectilinear path and always in the same line without the necessity of laterally shifting the rack-bar. It is likewise unnecessary to shift the gear-wheel or pinion in view of the fact that the teeth yield inward, so as to slip by the teeth on the rack. All lost motion between the reciprocating and rotary elements of the device is thus obviated and a positive and reliable engagement obtained.

The movement hereinabove described may be used in a variety of places and for a number of purposes and, in fact, wherever it is desirable to convert reciprocating into rotary motion.

I do not desire to be limited to the exact details of construction hereinabove set forth, as it will be apparent that the device is susceptible of changes in the form, proportion, and minor details of construction which may accordingly be resorted to without departing from the principle or sacrificing any of the advantages of the invention.

Having thus described the invention, what is claimed as new, and desired to be secured by Letters Patent, is—

1. A gear-wheel having pivoted teeth in combination with a single spring common to and normally holding all of said teeth in their operative positions but allowing the points thereof to yield inward.

2. A gear-wheel having pivoted teeth, in combination with a circular spring bearing against all of the teeth, substantially as described.

3. A gear-wheel having pivoted teeth, the bases of which lie in a circumferential plane, in combination with a circular spring bearing against the bases of all of the teeth, substantially as described.

4. A gear-wheel having pivoted teeth with concaved inner faces, in combination with a circular spring bearing against the concaved inner faces of all of the teeth.

5. A gear-wheel comprising parallel side plates, and teeth pivotally mounted between said plates and normally projecting beyond the peripheries thereof, in combination with a circular spring intermediate said side plates and common to and bearing against all the teeth to hold them normally in their operative positions while allowing them to yield, substantially as and for the purpose described.

6. The combination with a gear-wheel having yielding teeth, and a circular spring common to and operating against the inner ends of all of said teeth, of a reciprocating double rack engaging the teeth on opposite sides of the center of rotation of the gear-wheel, said spring permitting the teeth to yield alternately on opposite sides of said center, substantially as described.

In testimony whereof I affix my signature in presence of two witnesses.

JACOB E. HARTWELL.

Witnesses:
D. M. REYNOLDS,
G. W. WATERS.